United States Patent [19]

Ryder

[11] Patent Number: 5,799,850

[45] Date of Patent: Sep. 1, 1998

[54] VEHICLE GUN RACK

[76] Inventor: Dennis R. Ryder, 704 E. 20th, Pittsburg, Kans. 66762

[21] Appl. No.: 749,808

[22] Filed: Nov. 15, 1996

Related U.S. Application Data

[60] Provisional application No. 60/001,189, Nov. 17, 1995.

[51] Int. Cl.$^6$ .................................................. B60R 7/04
[52] U.S. Cl. ........................ 224/539; 224/42.11; 224/913
[58] Field of Search ................................ 224/913, 539, 224/42.11, 551

[56] References Cited

U.S. PATENT DOCUMENTS

| | | | |
|---|---|---|---|
| 2,750,088 | 6/1956 | Agostini et al. | 224/913 |
| 3,561,589 | 2/1971 | Larkin | 224/42.11 |
| 4,364,499 | 12/1982 | McCue | 224/913 |
| 4,560,134 | 12/1985 | Klein | 224/913 |
| 4,579,263 | 4/1986 | Ehmke et al. | 224/539 |
| 4,852,780 | 8/1989 | Woodbury | 224/913 |
| 4,936,531 | 6/1990 | Bauser | 224/42.11 |
| 5,443,191 | 8/1995 | Jorgenson | 224/913 |

*Primary Examiner*—Renee S. Luebke
*Attorney, Agent, or Firm*—Litman, McMahon & Brown, L.L.C.

[57] ABSTRACT

A vehicle gun rack includes a base assembly mounted on the vehicle floor and having a plurality of compartments. An arm assembly includes an arm mounted on the base and a crossbar mounted on the arm. A pair of guns or other objects can be mounted on the rack with lower ends thereof received in compartments in the base and with upper ends thereof secured to the crossbar on each side of the arm assembly. The base compartments are adapted for holding various objects, such as beverage containers.

9 Claims, 3 Drawing Sheets

VEHICLE GUN RACK

CROSS-REFERENCE TO RELATED APPLICATIONS

This application is a non-provisional application based on Provisional Application Ser. No. 60/001,189, Filed Nov. 17, 1995, and entitled VEHICLE INTERIOR RACK FOR FIREARMS, ARCHERY EQUIPMENT AND THE LIKE.

BACKGROUND OF THE INVENTION

1. Field of the Invention

The present invention relates generally to gun racks, and in particular to a gun rack for mounting on a vehicle floor.

2. Description of the Related Art

Firearms and other items are commonly placed in racks for convenient storage and accessibility. For example, various types of gun racks have previously been devised for supporting and securing guns in various locations and in various orientations, e.g., horizontal, vertical, etc. Both wall-mounted and freestanding gun racks are available and often include individual supports for a number of guns.

Certain types of gun racks have been devised for transporting guns in vehicles. For example, racks are available for mounting in the cab rear windows of pickup trucks which can hold several rifles, shotguns, fishing rods or other elongated items. Other types of gun racks have been designed for mounting in vehicles used in law enforcement activities.

A disadvantage with cab rear window type gun racks is that their usefulness is generally limited to pickup trucks whereby they are unsuitable for use in other types of passenger and sport utility vehicles. Difficulties can also arise in quickly accessing an object from a rack mounted behind the vehicle seats. Moreover, objects mounted behind the vehicle cab occupants can become dangerous flying objects in the event of a collision. Security issues can also arise in connection with guns which are mounted in plain view from the exterior of the vehicle.

The present invention addresses the shortcomings of previous vehicle gun racks. Heretofore there has not been available a vehicle gun rack with the advantages and features of the present invention.

SUMMARY OF THE INVENTION

In the practice of the present invention, a vehicle gun rack is provided which includes base and arm assemblies. The base assembly includes a base which mounts on the floor of a vehicle in front of a vehicle seat or seats. The base includes a plurality of compartments, including a pair of gun butt compartments. A pair of length-adjustable legs are mounted on the base and are adapted for engaging the underside of the vehicle dash. The arm assembly includes an arm with a proximate end anchored in the base and a distal end. The arm distal end mounts a crossbar with a pair of hooks, each of which is adapted for receiving the barrel of a rifle or shotgun mounted on the gun rack.

OBJECTS AND ADVANTAGES OF THE INVENTION

The principle objects and advantages of the present invention include: providing a vehicle gun rack; providing such a gun rack which is adapted for floor mounting in a vehicle; providing such a gun rack which includes a base with storage compartments; providing such a gun rack which is adapted for mounting in various vehicles; providing such a gun rack which can mount a pair of rifles or shotguns; providing such a gun rack which locates the guns within easy reach of the vehicle's occupants; providing such a gun rack which is adapted for relatively securely mounting objects therein; providing such a gun rack which can easily be fabricated from readily available parts and materials; providing such a gun rack which facilitates hunting from vehicles; providing such a gun rack which provides a relatively safe location for guns and other objects; providing such a gun rack which incorporates holders for beverage containers such as cups, cans and bottles; and providing such a vehicle gun rack which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

I. Introduction and Environment

Figure 1:
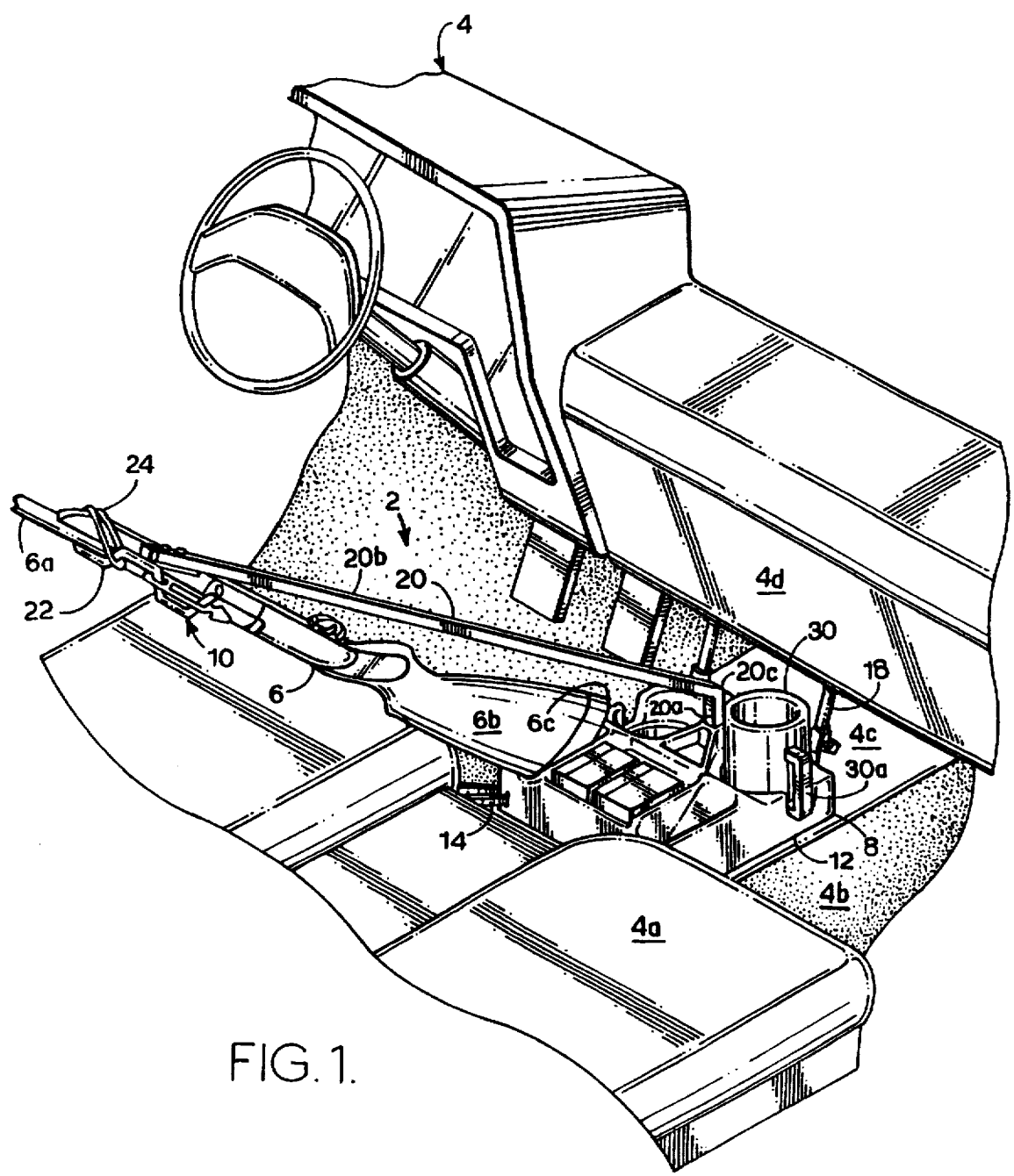
FIG. 1 is an upper, rear, perspective view of a vehicle gun rack embodying the present invention, shown mounted in a vehicle in front of the front seats thereof.
Figure 2:
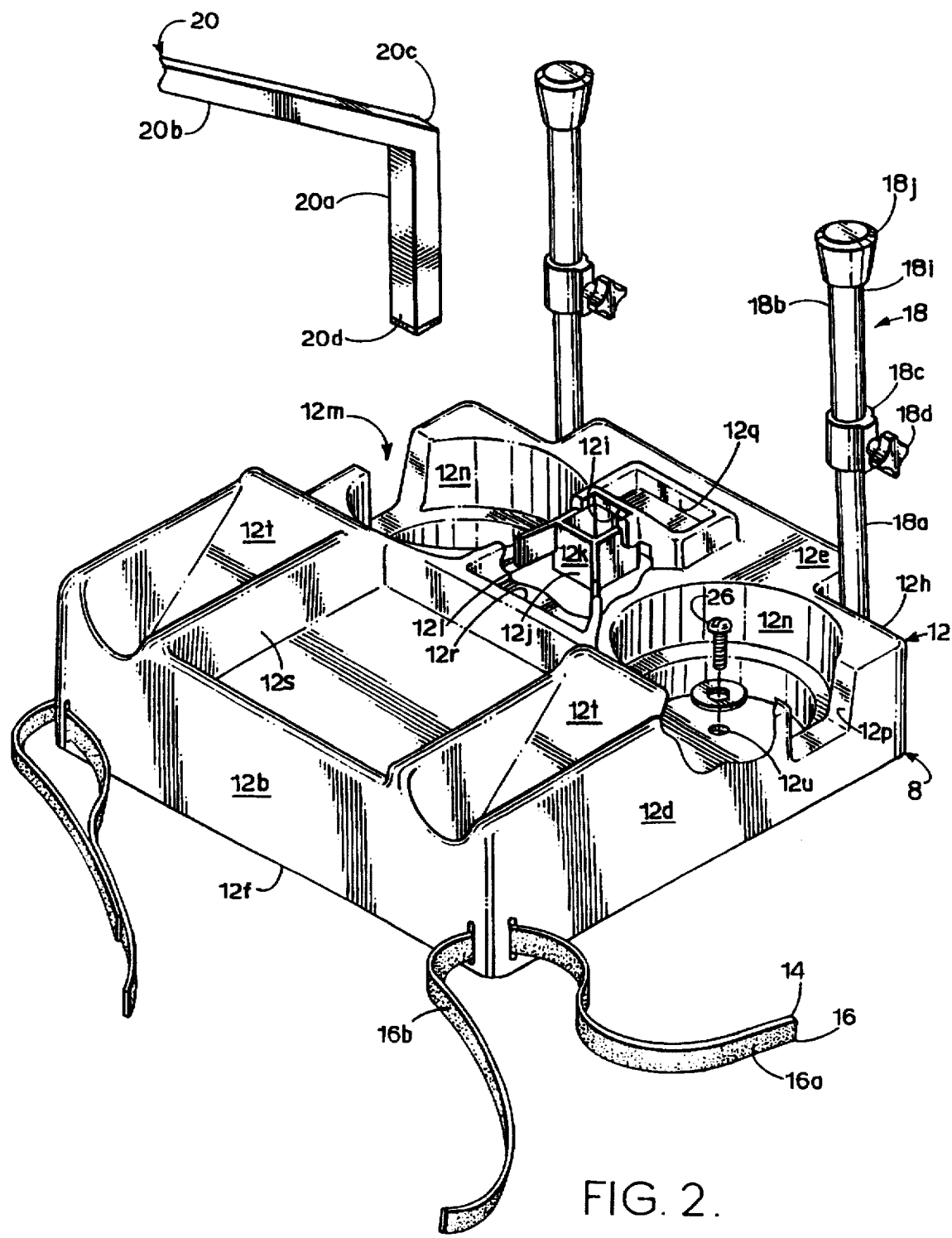
FIG. 2 is an enlarged, upper, perspective view of the vehicle gun rack, particularly showing a base assembly thereof.
Figure 3:
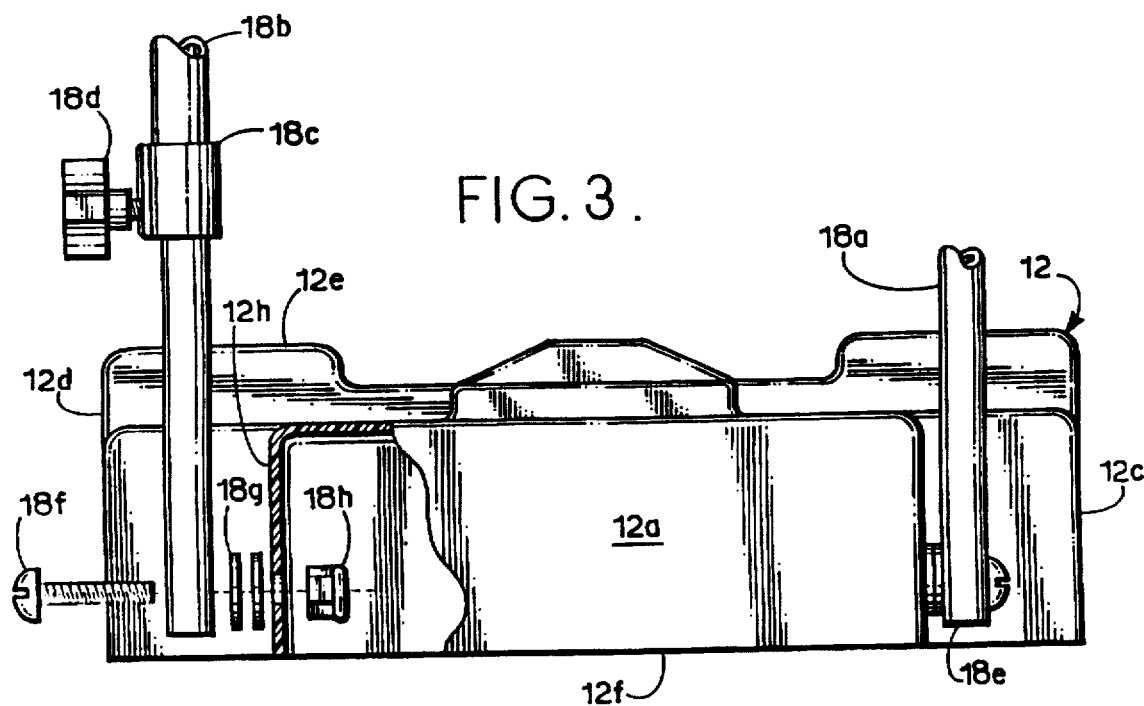
FIG. 3 is all enlarged, fragmentary, front elevational view of the vehicle gun rack, particularly showing the base assembly thereof with portions broken away to reveal internal construction.
Figure 4:
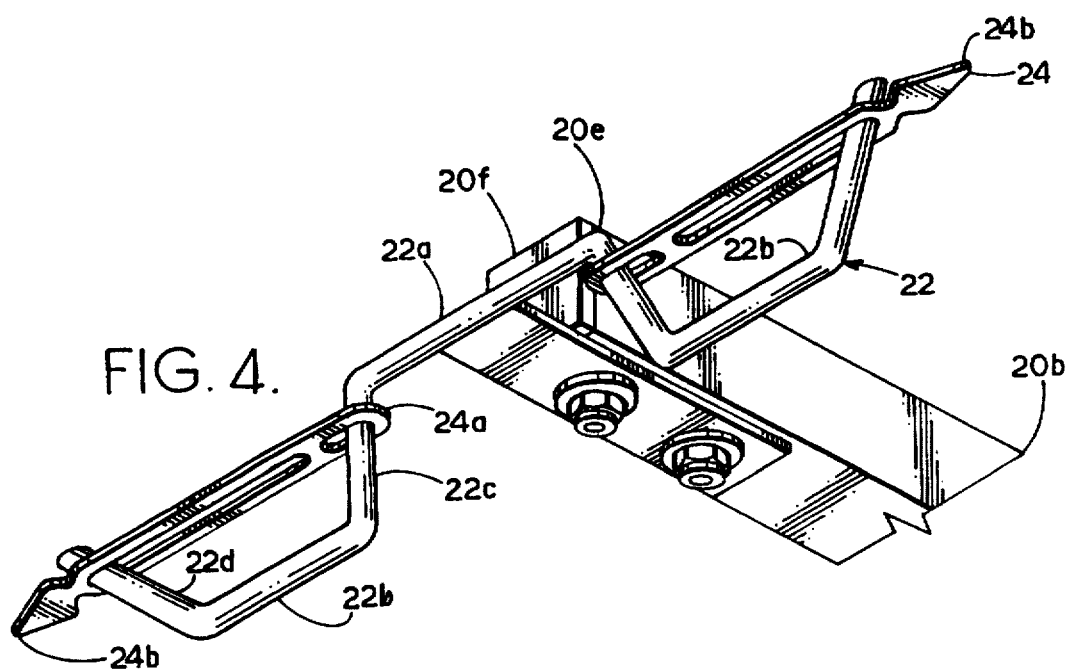
FIG. 4 is an enlarged, fragmentary, lower, rear perspective view of the vehicle gun rack, particularly showing the distal end of an arm assembly thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 2 generally designates a vehicle gun rack embodying the present invention. Without limitation on the generality of useful applications of the rack 2, it is shown mounted in a vehicle 4 including a seat 4a, a floor 4b with a longitudinally-extending tunnel 4c, and a dash 4d. The seat 4a can comprise either a bench-type seat or a pair of bucket seats. The rack 2 can be adapted to accommodate a variety of different vehicles by appropriately designing and installing it to avoid interference with parts of the vehicle such as shift levers, hand brakes, consoles and the like. Moreover, the rack 2 could be mounted in front of either the front or back seats in vehicles so equipped for access by occupants of any of the vehicle's seats.

Also without limitation on the generality of useful applications of the rack 2, it is shown mounting a gun 6 including a barrel 6a and a stock 6b having a butt 6c. Additionally, the rack 2 could mount such items as fishing poles, tools, etc.

The rack 2 generally comprises base and arm assemblies 8, 10.

II. Base Assembly 8

The base assembly 8 includes a base 12 with a front 12a, a back 12b, opposite sides 12c and 12d, a top 12e, and a bottom 12f. The base 12 forms a longitudinal axis 12g and is generally symmetrical with respect to same.

A pair of opposite leg recesses 12h are open at the base sides 12c,d adjacent to the base front 12a. A generally square socket 12i is open at the base top 12e. A socket reinforcement 12j includes a sleeve 12k received in the socket 12i and a plurality of wings 12l extending radially outwardly therefrom in engagement with the base top 12e.

The base 12 includes a receiver system 12m including a pair of container receivers 12n having generally circular configurations and notches 12p open at respective base sides 12c. The receiver system 12m further includes a front receiver 12q positioned in front of the socket 12i and a medial receiver 12r positioned just behind the socket 12i. A back receiver 12s is located adjacent to the base back 12b. The front, medial and back receivers 12q,r,s are located generally along the axis 12g. A pair of gun butt receivers 12t are each located adjacent a respective base side 12c and adjacent to the base back 12b. The receivers of the receiver system 12m are upwardly open at the base top 12e.

A pair of anchor belts 14 are mounted on the base 12 adjacent to the back 12b thereof and each adjacent to a respective base side 12c,d for anchoring the base 12 to the vehicle seat 4a. Each anchor belt 14 includes fastening means 16 such as a buckle or hook-and-loop type fastener 16a,b.

The base includes a pair of holes 12u each concentrically located in a respective container receiver 12n and open to the base bottom 12f.

The base assembly 8 includes a pair of legs 18 each having an inner, proximate tube 18a telescopically received in an outer, distal tube 18b. The outer, distal tube 18b mounts a collar 18c which threadably receives a set screw 18d adapted for selectively engaging the inner, proximate tube 18a. The inner, proximate tube 18a is telescopically received in the collar 18c. Each leg 18 includes a proximate end pivotally connected to the base 12 in a respective base leg recess 12h by a screw 18f, washer 18g and nut 18h assembly. Each leg 18 also includes a distal end 18i mounting a rubber tip 18j for engaging the underside of the vehicle dash 4d.

III. Arm Assembly 10

The arm assembly 10 includes an arm 20 with proximate and distal sections 20a,b which are integrally connected at an angular juncture 20c which generally forms an obtuse angle between the arm sections 20a,b. The arm 20 can comprise, for example, a continuous piece of tubing with a generally square cross-sectional configuration. The arm 20 includes a proximate end 20d received in the socket 12i and a distal end 20e mounting an end plug 20f.

The arm assembly 10 further includes a crossbar 22 with a medial section 22a mounted on the arm distal section 20b and a pair of opposite hooks 22b each including inner and outer legs 22c,d. A pair of elastomeric retainer straps 24 are provided and each includes an inner end 24a mounted on a respective hook inner leg 22c and an outer end 24b mounted on a respective hook outer leg 22d.

IV. Operation

In operation, the rack 2 is adapted for mounting in the vehicle 4 by placing the base 12 on the tunnel 4c in front of the seat 4a. The legs 18 are positioned underneath the vehicle dash 4d and are extended until the tips 18f are placed in engagement with the underside of the dash 4d. The anchor belts 14 are optional and can be used for fastening the base 12 to the vehicle seat 4a. Moreover, the base 12 can be mounted with screws 26 extended through base holes 12u and washers 28 and into the vehicle floor 4b.

A pair of guns 6 can be placed in the rack 2 by placing the gun butts 6c in the butt receivers 12t. The gun barrels 6a can be placed in the crossbar hooks 22b and secured therein by the retainer straps 24. The guns 6 are relatively securely retained in the gun rack 2. The receiver system 12n is adapted to receive a variety of different items. For example, the container receivers 12n can receive beverage containers 30, which can have their handles 30a turned outwardly and received in respective notches 12p. The other receivers can be sized to accommodate various items, such as ammunition in the back receiver 12s.

In operation, an occupant of the vehicle seat 4a can easily remove a gun 6 therefrom by releasing a retainer strap 24. The guns 6 are relatively securely retained in place in the rack 2, even in a moving vehicle.

It will be appreciated that the retainer strap 24 could be replaced by a locking mechanism, or suitable locks could be provided at other locations on the rack 2 for securing the guns 6 in place in the rack 2 and in the vehicle.

It is to be understood that while certain forms of the present invention have been illustrated and described herein, it is not to be limited to the specific forms or arrangement of parts described and shown.

What is claimed and desired to be secured by Letters Patent is as follows:

1. A rack for mounting on a vehicle floor in front of a vehicle seat and adapted for receiving a gun with a barrel and a stock having a butt, which includes:

(a) a base having:

(1) a front;

(2) a back;

(3) opposite sides;

(4) a bottom;

(5) a top;

(6) a longitudinal axis;

(7) a socket located on said longitudinal axis and open at said top;

(8) a socket reinforcement comprising a sleeve receiving said socket and a plurality of wings extending radially outwardly therefrom;

(9) a pair of gun butt receivers open at said base top and each located adjacent the base back and adjacent a respective base side;

(10) a pair of container receivers having generally circular configurations and open at the base top, each said container receiver being located adjacent to the base front and adjacent to a respective base side;

(11) a front compartment open at said base top and located along said base longitudinal axis in front of said socket;

(12) a medial compartment open at said base top and located along said base center line behind said socket;

(13) a rear compartment open at said base top and located along said center line adjacent to said base back; and

(14) a pair of leg recesses each open at a respective base side adjacent to said base front;

(b) first and second anchor belts each attached to said base at said base back adjacent to a respective base side, each said anchor belt including anchor belt fastening means for fastening said anchor belt in a fastened configuration;

(c) a pair of legs each having a proximate end pivotably connected to said base at a respective leg recess, inner and outer tubes telescopically interconnected, a collar mounted on said outer tube, a set screw threadably received in said collar and selectively engaging said inner tube, a distal end and a rubber tip mounted on said distal end; and (d) an arm assembly including:

(1) an arm with a proximate section received in said socket and a distal section, said proximate and distal sections forming an obtuse angle with respect to each other;

(2) said arm comprising a tube with a generally square cross-sectional configuration;

(3) a crossbar including a medial portion mounted transversely on said arm distal section, opposite crossbar hooks each connected to the medial portion and including inner and outer hook legs, each said hook being located adjacent to a respective crossbar end; and (4) a pair of retainer straps each having an inner end receiving a respective hook inner leg and an outer end receiving a respective hook outer leg.

2. A rack for a gun including a barrel and a stock with a butt, which rack includes:

(a) a base with opposite sides, a top, a bottom, a front, a back and a gun butt receiver open at the top;

(b) an arm assembly including an arm with proximate and distal sections and a crossbar mounted on the arm distal section;

(c) arm mounting means for mounting said arm proximate section to said base;

(d) base mounting means for mounting the base in a vehicle;

(e) said arm comprising a generally tubular member;

(f) said arm mounting means comprising a socket formed in said base and receiving said arm proximate section; and (g) a socket reinforcing generally surrounding said socket and including a sleeve and a plurality of arms extending radially outwardly therefrom in engagement with said base.

3. A rack for a gun including a barrel and a stock with a butt, which rack includes:

(a) a base with opposite sides, a top, a bottom, a front, a back and a gun butt receiver open at the top;

(b) an arm assembly including an arm with proximate and distal sections and a crossbar mounted on the arm distal section;

(c) arm mounting means for mounting said arm proximate section to said base;

(d) base mounting means for mounting the base in a vehicle;

(e) said arm assembly includes said crossbar having a medial portion mounted transversely on said arm distal section and a pair of hooks each projecting laterally outwardly from said crossbar medial portion;

(f) each said hook having inner and outer legs; and (g) a pair of elastomeric straps each having an inner end receiving a respective hook inner leg and an outer end selectively receiving a respective hook outer leg.

4. A rack for a gun including a barrel and a stock with a butt, which rack includes:

(a) a base with opposite sides, a top, a bottom, a front, a back and a gun butt receiver open at the top;

(b) an arm assembly including an arm with proximate and distal sections and a crossbar mounted on the arm distal section;

(c) arm mounting means for mounting said arm proximate section to said base;

(d) base mounting means for mounting the base in a vehicle; and (e) said base mounting means includes an anchor belt connected to said base back.

5. A rack for a gun including a barrel and a stock with a butt, which rack includes:

(a) a base with opposite sides, a top, a bottom, a front, a back and a pair of gun butt receivers open at the top;

(b) an arm assembly including an arm with proximate and distal sections and a crossbar mounted on the arm distal section;

(c) arm mounting means for mounting said arm proximate section to said base;

(d) base mounting means for mounting the base in a vehicle;

(e) said arm assembly including a cross bar having a medial portion mounted transversely on said arm distal section and a pair of hooks each projecting laterally outwardly from said cross bar medial portion;

(f) barrel retaining means mounting on said arm assembly and adapted for selectively retaining said gun barrel thereon;

(g) wherein said base includes a pair of compartments each located adjacent a respective base side; and (h) said base has a central compartment located between said gun butt receivers and is open at said base top.

6. The invention according to claim 5, wherein said compartments comprise generally circular, upwardly-open container holders each having a notch open at a respective base side.

7. A rack for a gun including a barrel and a stock with a butt, which rack includes:

(a) a base with opposite sides, a top, a bottom, a front, a back and a gun butt receiver open at the top;

(b) an arm assembly including an arm with proximate and distal sections and a crossbar mounted on the arm distal section;

(c) arm mounting means for mounting said arm proximate section to said base;

(d) base mounting means for mounting the base in a vehicle;

(e) said arm assembly including a cross bar having a medial portion mounted transversely on said arm distal section and a pair of hooks each projecting laterally outwardly from said cross bar medial portion;

(f) barrel retaining means mounting on said arm assembly and adapted for selectively retaining said gun barrel thereon; and (g) said arm proximate and distal sections forming an obtuse angle with respect to each other.

8. A rack for a gun including a barrel and a stock with a butt, which rack includes:

(a) a base with opposite sides, a top, a bottom, a front, a back and a gun butt receiver open at the top;

(b) an arm assembly including an arm with proximate and distal sections and a crossbar mounted on the arm distal section;

(c) arm mounting means for mounting said arm proximate section to said base;

(d) base mounting means for mounting the base in a vehicle; and;

(e) said arm assembly including a cross bar having a medial portion mounted transversely on said arm distal section and a pair of hooks each projecting laterally outwardly from said cross bar medial portion;

(f) barrel retaining means mounting on said arm assembly and adapted for selectively retaining said gun barrel thereon; and (g) said base mounting means comprises a length-adjustable leg mounted on said base in proximity to the front thereof.

9. A rack for a gun including a barrel and a stock with a butt, which rack includes:

(a) a base with opposite sides, a top, a bottom, a front, a back and a gun butt receiver open at the top;

(b) an arm assembly including an arm with proximate and distal sections and a crossbar mounted on the arm distal section;

(c) arm mounting means for mounting said arm proximate section to said base;

(d) base mounting means for mounting the base in a vehicle;

(e) said arm assembly including a cross bar having a medial portion mounted transversely on said arm distal section and a pair of hooks each projecting laterally outwardly from said cross bar medial portion;

(f) barrel retaining means mounting on said arm assembly and adapted for selectively retaining said gun barrel thereon;

(g) said arm comprising a generally tubular member; and (h) said arm mounting means comprising a socket formed in said base and receiving said arm proximate section.

* * * * *